(12) United States Patent
Dix

(10) Patent No.: US 11,518,447 B2
(45) Date of Patent: Dec. 6, 2022

(54) METHOD AND APPARATUS FOR TRANSPORTATION OF SPORTING EQUIPMENT

(71) Applicant: Christopher James Dix, Eureka, MO (US)

(72) Inventor: Christopher James Dix, Eureka, MO (US)

(73) Assignee: Christopher James Dix, Eureka, MO (US)

( * ) Notice: Subject to any disclaimer, the term of this patent is extended or adjusted under 35 U.S.C. 154(b) by 105 days.

(21) Appl. No.: 17/185,774

(22) Filed: Feb. 25, 2021

(65) Prior Publication Data

US 2021/0276631 A1   Sep. 9, 2021

Related U.S. Application Data

(60) Provisional application No. 62/981,386, filed on Feb. 25, 2020.

(51) Int. Cl.
  *B62D 33/02* (2006.01)
(52) U.S. Cl.
  CPC ................................ *B62D 33/0207* (2013.01)
(58) Field of Classification Search
  CPC ...... A01K 97/10; A01K 97/08; A47B 81/005; B62D 33/0207; B60R 9/045; B60R 2011/004; B60R 2011/0082; B60R 2011/0085

USPC .......... 248/513, 528; 211/195, 198, 200, 64, 211/70.8; 43/21.2; 294/159, 143, 146, 294/169; 224/913, 549

See application file for complete search history.

(56) References Cited

U.S. PATENT DOCUMENTS

| | | | | |
|---|---|---|---|---|
| 4,133,131 A * | 1/1979 | Davy | ..................... | A01K 97/08 248/528 |
| 4,479,322 A * | 10/1984 | Koppel | ................. | A01K 97/10 248/528 |
| 4,779,914 A * | 10/1988 | Friedline | ................ | A01K 97/10 211/198 |
| 5,495,969 A * | 3/1996 | Cardenas | .................. | B60R 7/14 211/195 |
| 5,603,439 A * | 2/1997 | Pineda | ...................... | B60R 7/02 224/403 |
| 5,803,519 A * | 9/1998 | Daigle | ................... | A01K 97/08 294/169 |
| 7,299,935 B2 * | 11/2007 | Skaley | ..................... | F16L 3/223 248/68.1 |

\* cited by examiner

*Primary Examiner* — Corey N Skurdal
(74) *Attorney, Agent, or Firm* — Lewis Rice LLC

(57) ABSTRACT

Methods and apparatus for transportation of equipment, generally but not necessarily limited to sporting equipment. Generally, the apparatus described herein comprises a collapsible or foldable frame adapted for installation in the bed of a pickup truck or similar vehicle, where the apparatus can be unfolded to a "deployment configuration" in which elongated equipment may be securely attached to the apparatus for transportation. The apparatus generally comprises two opposing rails with bracing and equipment storage elements mounted in between, foldable at about a midpoint for easy of storage when not in use.

20 Claims, 6 Drawing Sheets

METHOD AND APPARATUS FOR TRANSPORTATION OF SPORTING EQUIPMENT

CROSS-REFERENCE TO RELATED APPLICATIONS

This application claims the benefit of U.S. Prov. App. No. 62/981,386, filed Feb. 25, 2020, the entire disclosure of which is incorporated herein by reference.

BACKGROUND OF THE INVENTION

Field of the Invention

This disclosure is related to the field of outdoor recreation. In particular, it relates to methods and apparatus for transportation of sporting equipment via a temporary structure in the vehicle.

Description of the Related Art

Despite, or perhaps because of the prevalence of electronic devices in a perpetually on-line world, outdoor recreation is as popular as ever. For example, recreational fishing is estimated to be a $115 billion industry in the United States alone. This economic activity is comprised of a variety of goods and services, ranging from the purchase of clothing and equipment for outdoor recreation to guide services and travel expenses.

In addition to direct spending, this industry creates secondary spending. For example, a simple exercise such as taking a family camping requires the storage and transportation of a significant amount of equipment. Tents, bedrolls, pillows, cooking supplies, changes of clothing, firewood, emergency and safety equipment, and other gear must be stored in the home, and then transported to the campsite for use. For even a small family, this effectively requires either a separate trailer or a vehicle with sufficient cargo capacity, such as a van, truck, or SUV.

Even with a trailer or high capacity transportation vehicle, certain types of equipment are difficult to transport. Fishing poles and related equipment present unique difficulties because the poles themselves are lengthy, but also, by their nature, flexible. Further, poles that have been assembled generally already have a fishing hook attached, which must be secured to prevent accidental injury or damage. Additionally, usually the poles cannot be merely placed in a trailer, truck bed, or a van, because they will jostle around during the trip, and the reels or poles may become damaged, or may damage other equipment.

Although it is possible to mount clips for holding the poles, this requires modification of the vehicle, which is generally intended for a different purpose. For example, a family van is intended for transporting family members, and transporting fishing poles is an unusual and less common use. Therefore, it is not desirable to install fishing pole clips in the family van.

Likewise, a truck bed loses much of its versatility if clips are installed, which could be damaged by other cargo stored in the truck bed. Also, most trailers are not deep enough to accommodate a fishing pole. Moreover, even if a set of clips is installed, they can carry only a single pole, whereas a family on a trip will generally have more than one pole, sometimes as many as a half dozen or more. Likewise, even a solo fisherman may bring multiple poles on a fishing outage, depending on the type of fish, terrain, water, weather, or other considerations. It is not unusual for one experienced fisherman to bring as many as four to six poles. Thus, installing a set of clips is not practical or sufficient.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a foldable device for transportation of sporting equipment comprising: a top rail generally in the configuration of an elongated rectangular prism and comprising a first top rail segment and a second top rail segment; a bottom rail opposing the top rail, the bottom rail generally in the configuration of an elongated rectangular prism and comprising a first bottom rail segment and a second bottom rail segment; a folding element extending between the top rail and the bottom rail, the folding element having a top end attached to the first top rail segment and the second top rail segment, and an opposing bottom end attached to the first bottom rail segment and the second bottom rail segment, such that the foldable device is foldable at the folding element; and a first equipment mounting element, attached to, and extending between, the top rail to the bottom rail.

In an embodiment of the foldable device, the foldable device further comprises a second equipment mounting element, attached to, and extending between, from the top rail to the bottom rail.

In another embodiment of the foldable device, the first equipment mounting element comprises a first fishing pole holder and the second equipment mounting element comprises a second fishing pole holder.

In another embodiment of the foldable device, the foldable device further comprises a third equipment mounting element, attached to, and extending between, from the top rail to the bottom rail.

In another embodiment of the foldable device, the third equipment mounting element is a third fishing pole holder, the first fishing pole holder is disposed at a first end of the foldable device, the second fishing pole holder is disposed at a second end of the foldable device opposing the first end, and the third fishing pole holder is disposed adjacent the folding element.

In another embodiment of the foldable device, the first equipment mounting element, the second equipment mounting element, and the third equipment mounting element are generally parallel to one another, and generally perpendicular to the top rail and the bottom rail.

In another embodiment of the foldable device, the first fishing pole holder comprises a channel sized and shaped to receive a fishing pole handle, the second fishing pole holder comprises a channel sized and shaped to receive fishing pole rod tip, and the third fishing pole holder is a fishing pole rod clip.

In another embodiment of the foldable device, the foldable device further comprises a first bracing element generally in the configuration of an elongated rectangular prism, the first bracing element attached to, and extending between, the top rail and the bottom rail.

In another embodiment of the foldable device, the first bracing element is generally perpendicular to the top rail and the bottom rail.

In another embodiment of the foldable device, the first bracing element is disposed adjacent to the first equipment mounting element.

In another embodiment of the foldable device, the first bracing element comprises a major plane, the first equipment mounting element comprises a major plane, and the first bracing element and the first equipment mounting elements are disposed such that their respective major planes are generally perpendicular In another embodiment of the foldable device, the foldable device further comprises a second bracing element, the second bracing element attached to, and extending diagonally between, the first top rail segment and the first bottom rail segment.

In another embodiment of the foldable device, the device is foldable to a folded configuration to cause a distal end of first top rail segment to abut a distal end of the second top rail segment, and to cause a distal end of first bottom rail segment to abut a distal end of the second bottom rail segment.

In another embodiment of the foldable device, a first attaching element is disposed on the first bottom rail segment, and a second attaching element is disposed on the second bottom rail segment element, and the first attaching element and the second attaching element attach to one another.

In another embodiment of the foldable device, the first attaching element comprises a clasp and the second attaching element comprises a latch.

In another embodiment of the foldable device, the first attaching element is disposed at the distal end of the first top rail segment, and aid second attaching element is disposed at the distal end of the second top rail segment such that when the foldable device is in the folded configuration, the first attaching element is attachable to the second attaching element to lock the foldable device in the folded configuration.

In another embodiment of the foldable device, the first attaching element is disposed at a proximal end of the first top rail segment, and the second attaching element is disposed at a proximal end of the second top rail segment such that when the foldable device is in an open configuration in which the first top rail segment and the second top rail segment are aligned to form a rectangular prism, the first attaching element is attachable to the second attaching element to lock the foldable device in the open configuration.

In another embodiment of the foldable device, the foldable device further comprises a plurality of adjusting elements.

In another embodiment of the foldable device, the each of the plurality of adjusting elements comprises an adjustable, swivel-mounting leveling foot extending outwardly from opposing ends of the foldable device.

In another embodiment of the foldable device, the foldable device has an installation length selected for installation of the foldable device in a vehicle storage area.

DESCRIPTION OF THE PREFERRED EMBODIMENT(S)

The following detailed description and disclosure illustrates by way of example and not by way of limitation. This description will enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Described herein, among other things, are methods and apparatus for transportation of equipment, generally, but not necessarily limited to, sporting equipment. Generally, the apparatus described herein comprises a collapsible or foldable frame adapted for installation in the bed of a pickup truck or similar vehicle, where the apparatus can be unfolded to an open or "deployment configuration" in which elongated equipment may be securely attached to the apparatus for transportation. This disclosure is made with respect to fishing poles, but it will be clear to a person of ordinary skill in the art that the general structure of the apparatus may be suitable for use with other equipment by installing appropriate holders and clips specific to the equipment in question.

Figure 1:
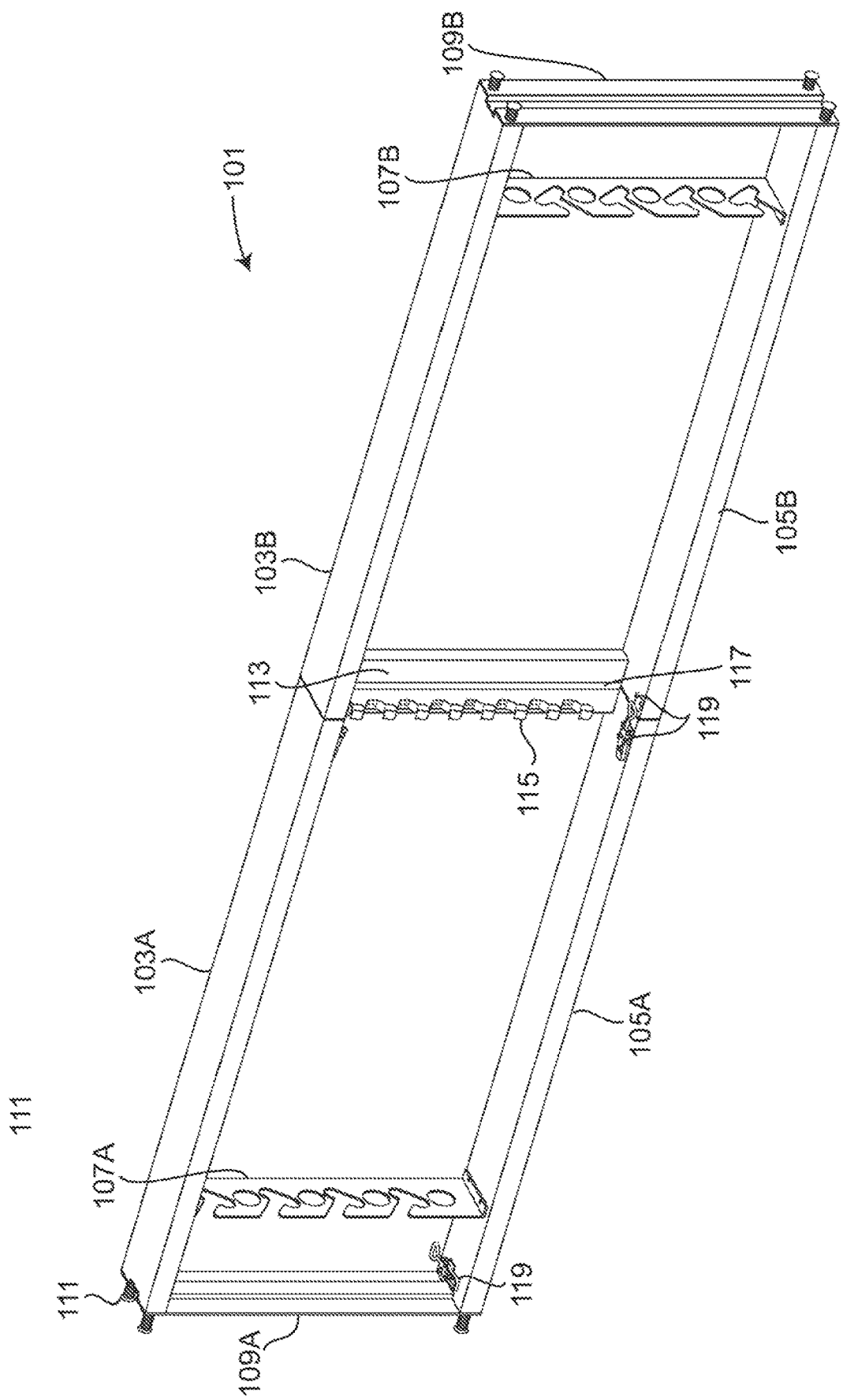
FIG. 1 depicts a perspective view of an embodiment of an equipment transportation apparatus according to the present disclosure, deployed in open position.

FIG. 1 depicts an embodiment of an apparatus as described herein in an unfolded, open or "deployment configuration." The depicted embodiment (101) comprises a top rail (103A) and (103B), referred to together as (103) for sake of simplicity, and an opposing bottom rail (105A) and (105B) together, (105). In the depicted embodiment, the top rail (103) is comprised of two segments (103A) and (103B). The top rail (103) is general in the configuration of an elongated rectangular prism, similar to two by four lumbar. The depicted top rail (103) is split in half between segments (103A) and (103B), for purposes of facilitation of the folding aspect described elsewhere herein. Although the depicted segments (103A) and (103B) are approximately the same dimension and shape, this is not a limiting embodiment, and, in an alternative embodiment, the segments (103A) and (103B) may be different lengths, shapes, or sizes. In the unfolded position depicted in FIG. 1, (103A) and (103B) are generally collinear along their major axes, forming a rectangular prism.

The depicted bottom rail (105) is similar in structure to the depicted top rail (103). The depicted bottom rail (105) comprises two segments (105A) and (105B) of approximately the same length and shape, split at about a midpoint so that the two segments (105A) and (105B) each comprise about half of the total length of the bottom rail (105). Again, this split is to facilitate the folding aspect described elsewhere herein. Although the depicted segments (105A) and (105B) are approximately the same dimension and shape, this is not a limiting embodiment, and, in an alternative embodiment, the segments (105A) and (105B) may be different lengths, shapes, or sizes. In the unfolded position depicted in FIG. 1, (105A) and (105B) are generally collinear along their major axes, forming a rectangular prism.

Figure 6:
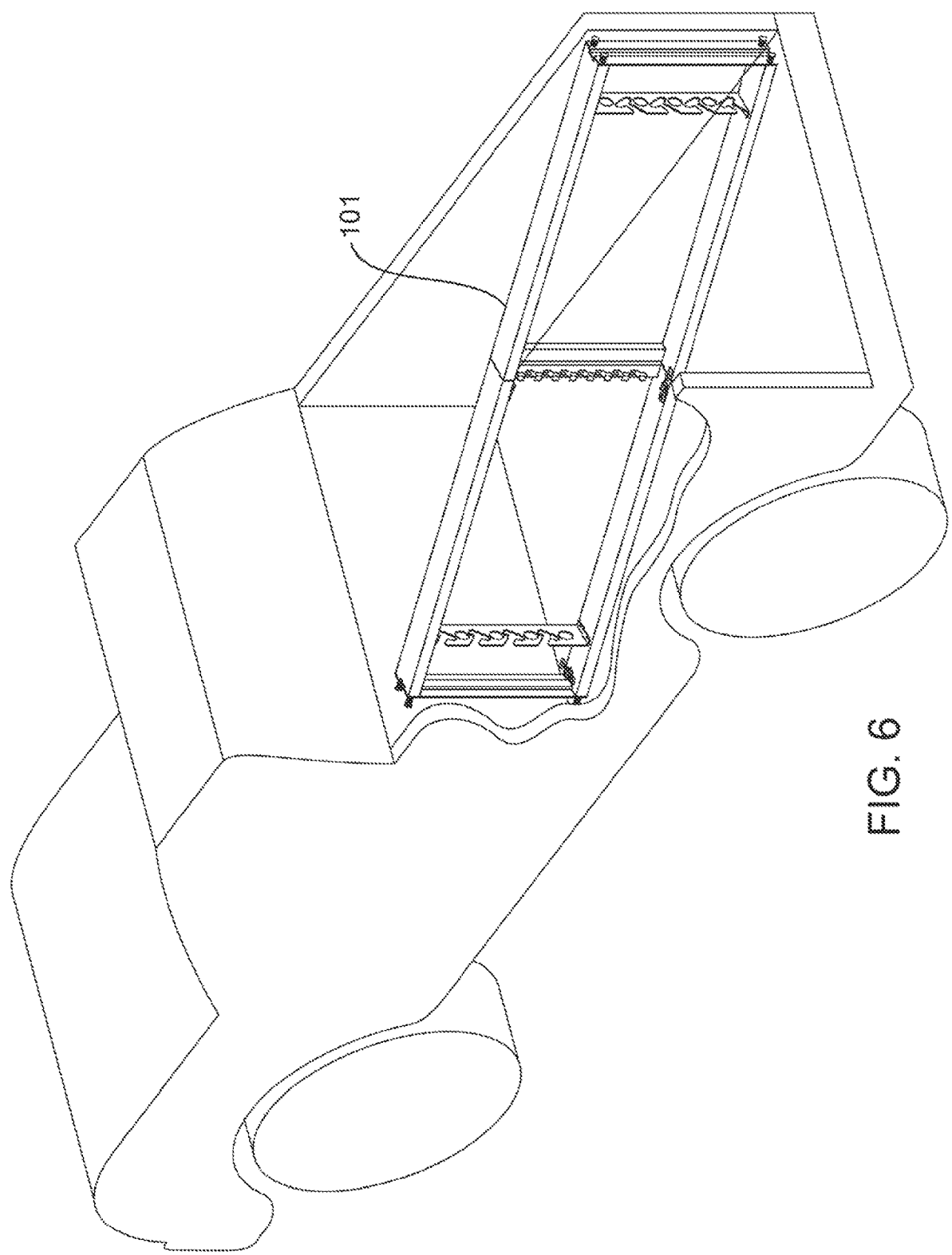
FIG. 6 depicts a cutaway view of a vehicle having an equipment transportation apparatus according to the present disclosure installed thereon.

As can be seen in FIG. 1, in unfolded configuration, the top rail (103) and bottom rail (105) are generally parallel to one another. These rails (103) and (105) provide a top and bottom supporting frame for the equipment mounting elements described elsewhere herein, and are preferably made of a lightweight but relatively rigid material that can withstand the elastic and compressive forces associated with transportation. Generally speaking, the overall lengths of the top and bottom rails (103) and (105) are about the same, which facilitates installation in a pickup bed. The lengths are generally selected with respect to the diagonal dimension of a pickup bed in which the apparatus (101) is intended to be installed. Many pickup beds have generally standard or similar dimensions, allowing a given apparatus (101) to be used with various truck models and, using extension feet (111), as described elsewhere herein, to fine-tune the installation for fit and stability. FIG. 6 depicts an embodiment of the apparatus (101) installed in open position in the bed of a pickup truck.

In the depicted embodiment (101), extending inwardly from and between the top (103) and bottom (105) rails at approximately a center point is a folding element (113). The depicted folding element (113) is generally in the configuration of two rectangular prisms arranged side-by-side along their longer sides and mounted together by a hinge (117). In unfolded configuration, the two prisms effectively form a single wider prism. Each of the two prisms is shown attached to one side of the rails. That is, the left-most prism is attached at its top to segment (103A) of the top rail (103), and attached at its bottom to segment (105A) of the bottom rail (105). Likewise, the right-most prism is attached at its top to segment (103B) of the top rail (103), and attached at its bottom to segment (105B) of the bottom rail (105). Thus, when the hinge (117) is operated, the two prisms pivot at the hinge (117) for folding the apparatus (101) in half. The location of the folding of the hinge (117) is vertically aligned with the split between the respective segments (103A) and (103B) of the top rail and (105A) and (105B) of the bottom rail. The depicted folding element (113) is generally perpendicular to the top and bottom rail (103) and (105).

In the depicted embodiment, the folding element (113) is attached in a generally perpendicular configuration with respect to the top rail (103) and bottom rail (105). Likewise, the two halves of the folding element (113) are disposed at the inner edges of each of the segments (103A) and (103B), and (105A) and (105B), to facilitate the folding action. The depicted folding element (113) also provides a vertical support or brace which holds the top (103) and bottom rails (105) rails apart from each other at a desired distance, and provides vertical rigidity to prevent collapse of the apparatus (101).

In the depicted embodiment, the apparatus (101) further comprises one or more equipment mounting elements (107A) and (107B) (together, 107). In the depicted embodiment, the equipment mounting elements (107) are disposed at/or near opposing distal ends of the top and bottom rail (103) and (105), and extend vertically between the top rail (13) and bottom rail (105). The depicted equipment mounting elements (107) are generally elongated vertical components attached perpendicularly to the top rail (103) and bottom rail (105). In this fashion, they provide further vertical structural support for the top rail (103) and bottom rail (105). The depicted elements (107) are attached on a top surface of the bottom rail (105). and on a bottom surface of the top rail (103), but, this is not a limiting embodiment and in an alternative embodiment, a different attaching point may be used. In the depicted embodiment, the equipment mounting elements (107) are about the same length as the folding element (113), which further facilitates the depicted parallel arrangement of the top rail (103) with the bottom rail (105).

Figure 4:
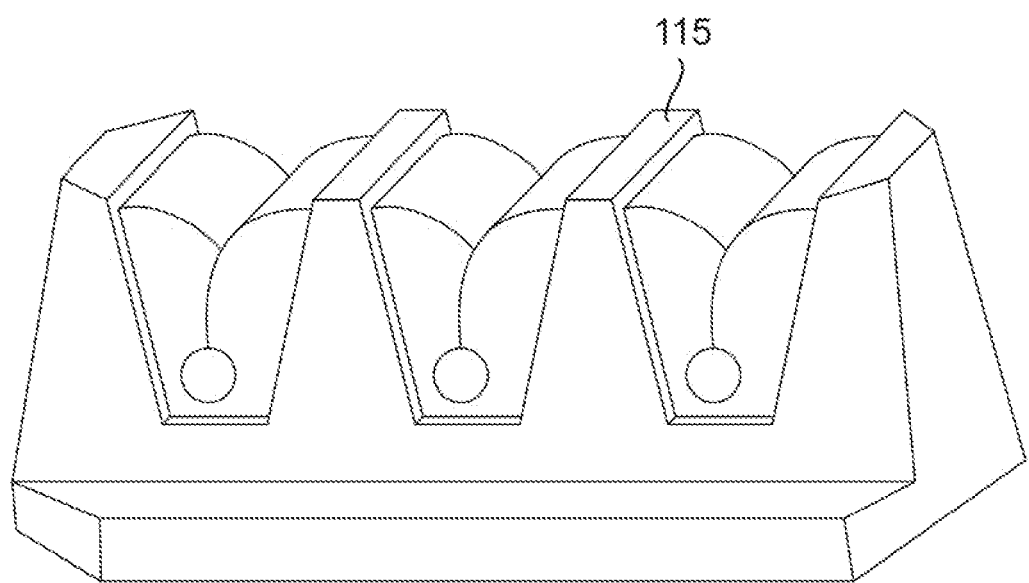
FIG. 4 depicts a detail view of an embodiment of an equipment mounting element for use with an equipment transportation apparatus according to the present disclosure.

The depicted equipment mounting elements (107) are in the configuration of sets of fishing pole holders. When the apparatus (101) is unfolded, as shown in FIG. 1, the butt end of a fishing rod may be inserted in the holes in one of the two elements (107A) or (107B), and the opposing tip ends of the rods may be slid into a corresponding channel of the opposing element (107A) or (107B). It will be understood that not all fishing poles are necessarily long enough to mount in both of the equipment mounting elements (107). In some circumstances, one or more sets of secondary equipment mounting elements (115) may be installed at or on the folding element (113) or another location. For example, in the depicted embodiment, a set of rod clips (115) is installed vertically on, or at, one of the two prisms of the hinging element (113). These clips (115) can be used to hold one or more fishing pole rods, while the butt end of the pole is held in one of the equipment mounting elements (107). Although an open clip (115) is shown in FIG. 1, it will be understood that other clips (115) may be used, and may in some embodiments may be preferable. By way of example, and not limitation, an alternative embodiment of such clips (115) is shown in FIG. 4, which uses a pair of adjacent foam surfaces with an inner cavity to hold a rod(s) in place with reduced risk of damage to the rod or attached line.

Also shown in the depicted embodiment of FIG. 1 are bracing elements (109A) and (10913) (together, 109). The depicted bracing elements (109) are generally vertical elements extending from the opposing distal of the top rail (103) to the corresponding and opposing distal ends of the bottom rail (105). These bracing elements (109) provide further vertical support for the top and bottom rails (103) and (105). In the depicted embodiment, the bracing elements (109) are installed at opposing ends and are generally parallel with one another, and have a width generally the same as the width of the top and bottom rail (103) and (105). However, in an alternative embodiment, a different installation may be preferred. For example, as can be seen in the depicted embodiment of FIG. 5, it may be desirable to install the bracing elements (109) on a lateral edge of the top rail (103) and bottom rail (105). This configuration has the advantage of moving the bracing elements (109) out of the way of the installation path for the equipment mounting elements (107). This allows for longer equipment to be installed, without risk of bumping into the bracing elements (109) and potentially damaging the equipment or the bracing elements (109). This position may also provide additional structural support and rigidity, by providing a backing support surface for the equipment mounting elements (107).

In another embodiment, these bracing elements (109) may be installed at a still different location. For example, because the equipment mounting elements (107) provide vertical supports near the ends of the rails (103) and (105), the bracing elements (109) may be moved inward closer to each other to provide an additional vertical support between the rails (103) and (105) at another location. By way of example and not limitation, the bracing elements (109) may be disposed about halfway between the distal ends of the rails (103) and (105) and the hinging element (113).

Figure 5:
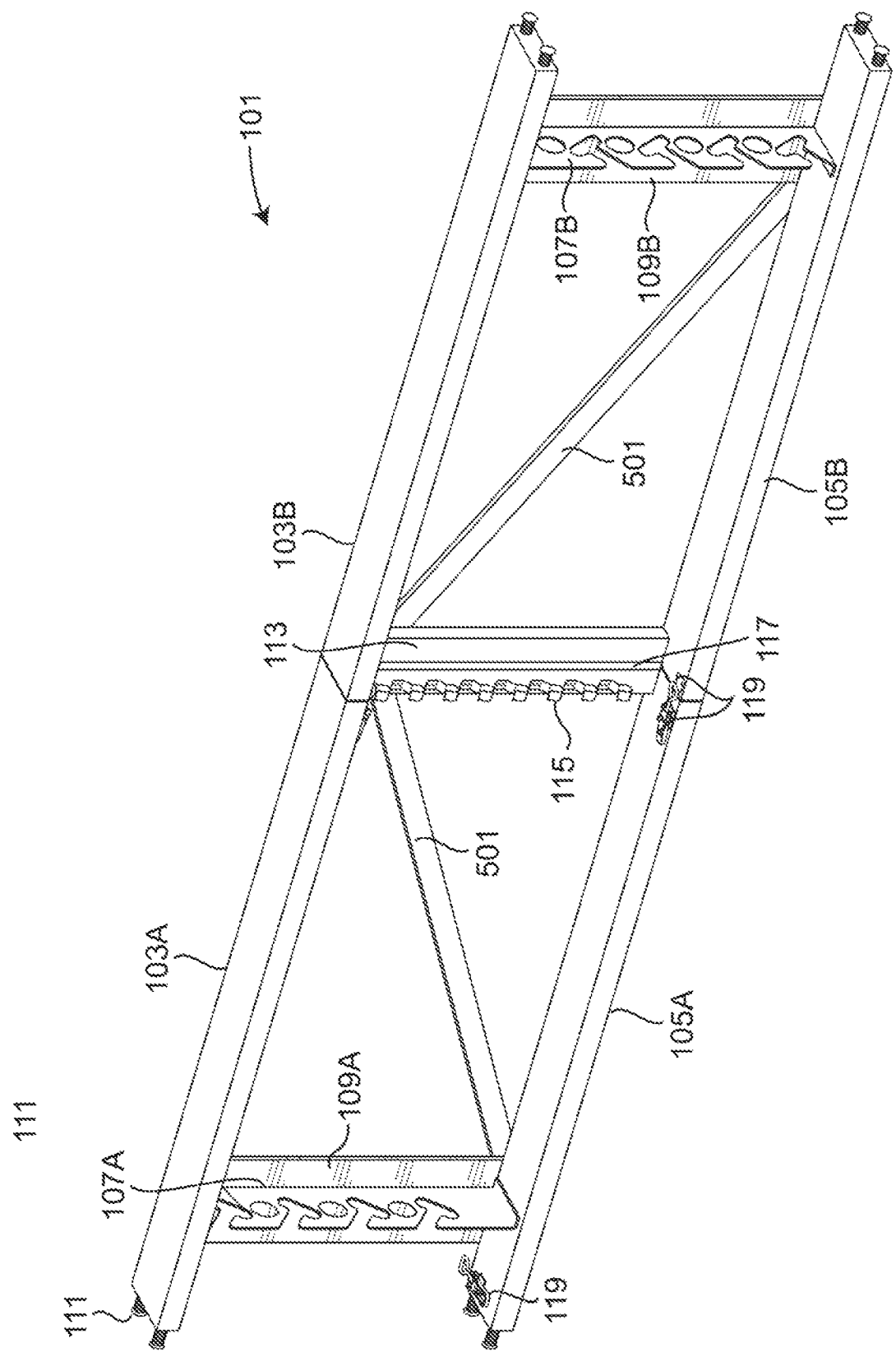
FIG. 5 depicts a perspective view of an alternative embodiment of an equipment transportation apparatus according to the present disclosure having additional stabilizing elements.

As can be seen in FIG. 5, in this embodiment, the major axis of the bracing elements (109) is generally perpendicular to the major axis of the top (103) and bottom rail (105), but is not coplanar with the major axis of the top (103) and bottom rails (105). By contrast, in the embodiment of FIG. 1, the bracing elements (109) are attached at the ends of the rails (103) and (105), and the major axes of the bracing elements (109) are generally coplanar with each other, and with the major axis of the top (103) and bottom rails (105). The embodiment of FIG. 5 may be preferred in instances where very long poles may be installed, and it is desirable to move the bracing elements (109) away from the ends of the rails (103) and (105) so that they do not interfere with the equipment mounted in the apparatus (101).

In an embodiment, the apparatus (101) may be further supported or reinforced with additional bracing elements, or reinforcing elements. Generally speaking, such reinforcing elements would connect various other structural elements of the apparatus (101) in a manner to provide additional structural rigidity. The depicted embodiment of FIG. 5 has two such reinforcing elements (501) disposed in a diagonal fashion. However, in an another embodiment, there may be a different number, shape, or configuration of reinforcing elements (501) depending on the needs of the particular embodiment (e.g., size of components, anticipated operational stresses, material strength, etc.).

Figure 2:
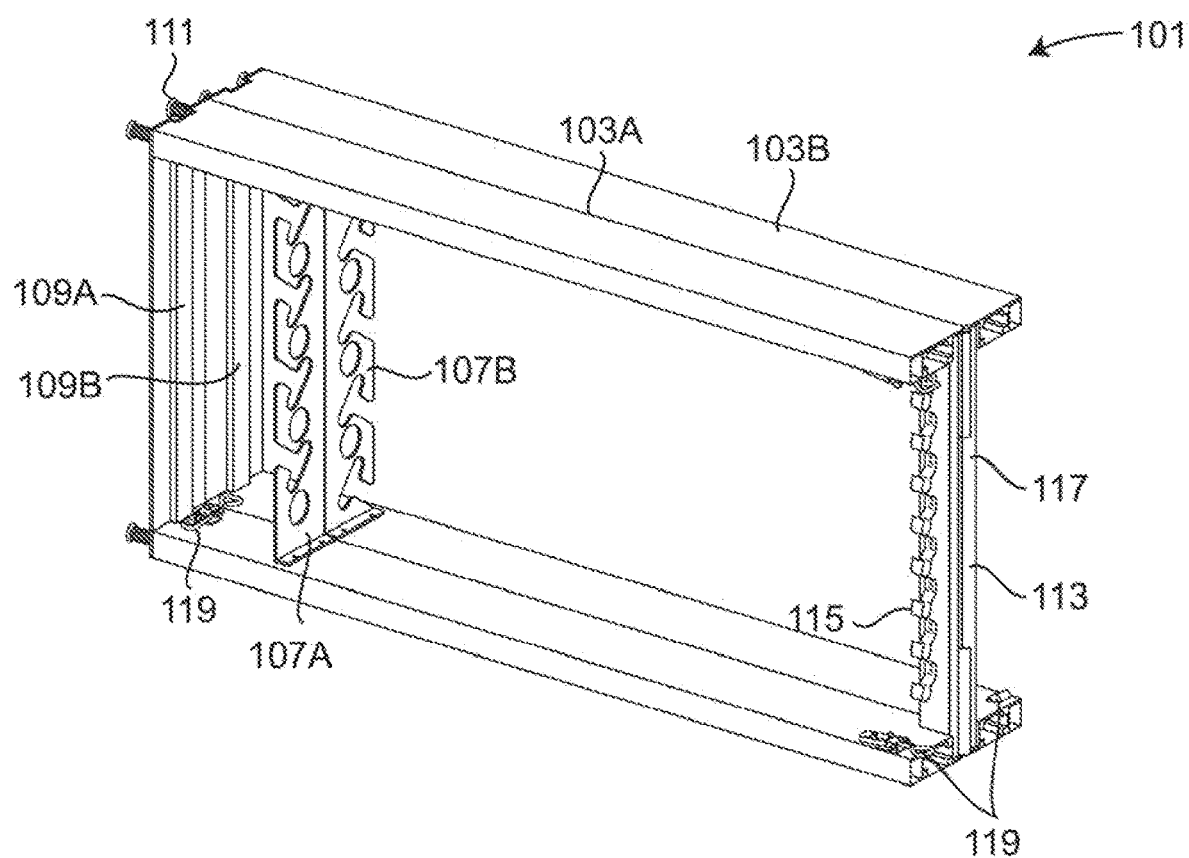
FIG. 2 depicts a perspective view of the embodiment of FIG. 1 in a closed position.

FIG. 2 depicts the embodiment of FIG. 1 in a "closed" or "folded" configuration for storage. In the depicted embodiment of FIG. 2, the apparatus (101) is folded at about its midpoint around the folding element (113). As described elsewhere herein, the segments of the top (103) and bottom rails (105), and the folding element (113), are attached and configured so that the apparatus (101) can be folded in half at the folding element (117). This allows the apparatus (101) to be collapsed into a smaller configuration for easier storage, such as in a truck bed, or a garage or basement. In this closed configuration, one or more attaching element(s) (119) may be used to hold the apparatus (101) in closed position. Likewise, in open position, one or more attaching element(s) (119) may be used to hold the apparatus (101) in an open position.

As can be seen in the drawings, the attaching element(s) (119) may comprise two corresponding elements, such as a clasp and latch, disposed different parts of the apparatus (101) to effect the attaching function. For example, the first attaching element (119) may comprise a clasp disposed on the bottom rail segment (105A) at a distal end thereof, and a corresponding latch component disposed at the opposing distal end of the bottom rail segment (105B). When the apparatus (101) is closed, these two elements (119) are adjacent to one another, and the clasp can be attached to the latch to lock the apparatus (101) in closed position. The same approach may be used to facilitate locking the apparatus (101) in open position.

As also can be seen in FIG. 2, the secondary retaining element (115) should be disposed on a side of the folding element (113) outside of the folding direction, so that the retaining element (115) does not interfere with the folding action. Likewise, the dimensions and structure of the sports equipment holding elements (107) should general be selected and configured so that they do not extend beyond the side edges of their corresponding top and bottom rail segments, otherwise, they may interfere with proper closing of the apparatus (101).

Also shown in the FIGS. are adjusting elements (111). The depicted adjusting elements (111) may be used to fine-tune the installation of the apparatus (101) in a vehicle. The depicted adjusting elements (111) are generally adjustable extensions that protrude from the distal ends of the top (103) and bottom (105) rail segments. When the apparatus (101) is unfolded and installed diagonally in a pickup bed, these elements (111) can be individually extended to contact the interior surfaces of the bed to hold the apparatus (101) in place.

Figure 3:
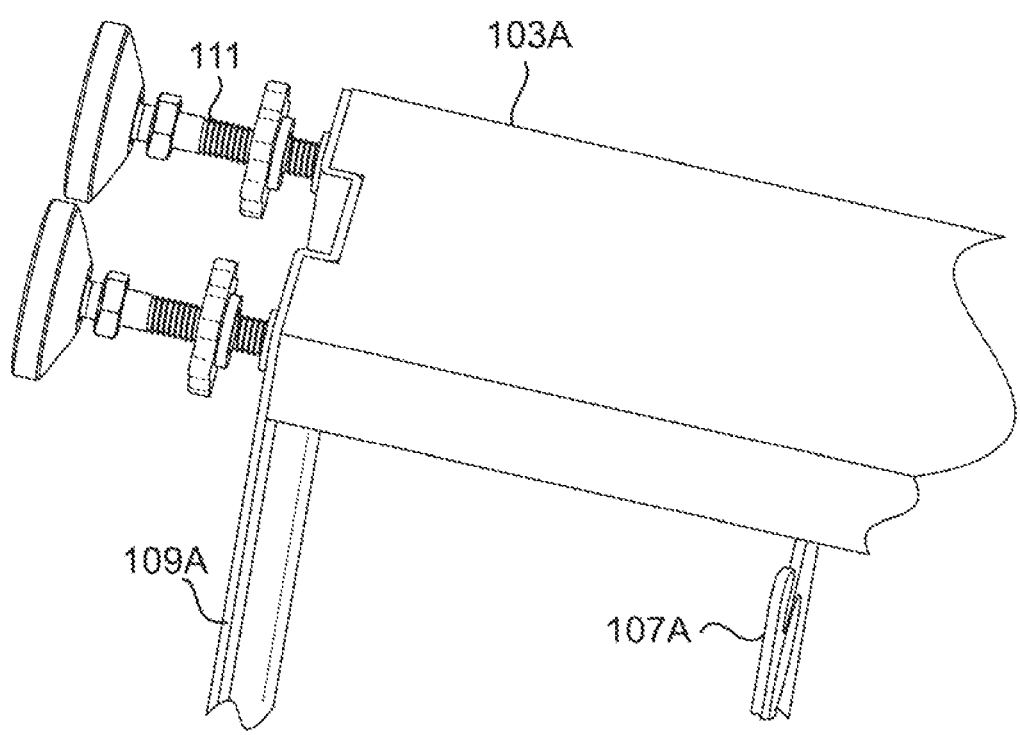
FIG. 3 depicts a detail view of a corner of the embodiment of FIG. 1.

For example, in FIG. 3, the adjustment mechanisms (111) comprise four adjustable leveling feet installed laterally along the major axis of the rails (103) and (105). This allows the feet (111) to be individually extended a suitable distance from the distal end of each of the rails (103) and (105), and a swivel mounted foot can be used to brace the apparatus (101) against the inside surfaces of a truck bed. The feet (111) may comprise pads, such as rubber covers, to improve grip and prevent scratching. The depicted leveling feet (111) comprise a locking element (such as a nut) to hold the extensions in place at the desired amount of extension. In alternative embodiments, a spring loaded mount may be used to simplify installation.

When the apparatus (101) is unfolded for deployment, the overall length of the rails (103) and (105) is generally greater than either of the major dimensions of the pickup bed into which it will be installed. That is, the length of the apparatus (101) exceeds the width or depth of the pickup bed, which is generally too small to accommodate a fishing pole installed along the width or depth. However, by unfolding the apparatus (101) and installing it diagonally from corner to corner, more interior distance can be created to facilitate long equipment, such as fishing poles.

In a still further embodiment, the apparatus (101) may further comprise a cover which may be placed over it to prevent passing debris or wind from dislodging the equipment. As can be seen, a plurality of fishing poles may be installed on the apparatus (101). For example, four butt ends may be installed at a first distal end on the one (107A) of the two mounting elements, with the tips facing the other direction towards the opposing mounting element (107B). A second set of poles can be installed with the butt end on the opposing (107B), with the tips facing back towards the first mounting element (107A). This allows the poles to be sufficiently staggered so that the reels and other equipment do not interfere with each other or become tangled.

Throughout this disclosure, terms such as "generally," "about," and "approximately" may be used, such as, but not necessarily limited to, with respect to geometric terms, including shapes, sizes, dimensions, angles, and distances. One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion, natural wear, and other deformations. Further, there exists for every object a level of magnification at which geometric descriptors no longer apply due to the nature of matter. One of ordinary skill in the art will understand how to apply relative terms such as "generally," "about," and "approximately" to describe a range of variations from the literal geometric meaning of the qualified term in view of these and other considerations. Additionally, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A foldable device for transportation of sporting equipment comprising:
    a top rail generally in the configuration of an elongated rectangular prism and comprising a first top rail segment and a second top rail segment;
    a bottom rail opposing said top rail, said bottom rail generally in the configuration of an elongated rectangular prism and comprising a first bottom rail segment and a second bottom rail segment;
    a folding element extending between said top rail and said bottom rail, said folding element having a top end attached to said first top rail segment and said second top rail segment, and an opposing bottom end attached to said first bottom rail segment and said second bottom rail segment, such that said foldable device is foldable at said folding element;
    a first fishing pole holder attached to, and extending between, said top rail and said bottom rail;
    a second fishing pole holder attached to, and extending between, said top rail and said bottom rail; and
    a third fishing pole holder attached to, and extending between, said top rail and said bottom rail.

2. The foldable device of claim 1, wherein said first fishing pole holder is disposed at a first end of said foldable device, said second fishing pole holder is disposed at a second end of said foldable device opposing said first end, and said third fishing pole holder is disposed adjacent said folding element.

3. The foldable device of claim 2, wherein said first fishing pole holder, said second fishing pole holder, and said third fishing pole holder are generally parallel to one another, and generally perpendicular to said top rail and said bottom rail.

4. The foldable device of claim 2, wherein said first fishing pole holder comprises a channel sized and shaped to receive a fishing pole handle, said second fishing pole holder comprises a channel sized and shaped to receive fishing pole rod lip, and said third fishing pole holder is a fishing pole rod clip.

5. The foldable device of claim 1, further comprising a first bracing element generally in the configuration of an elongated rectangular prism, said first bracing element attached to, and extending between, said top rail and said bottom rail.

6. The foldable device of claim 5, wherein said first bracing element is generally perpendicular to said top rail and said bottom rail.

7. The foldable device of claim 6, wherein said first bracing element is disposed adjacent to said first fishing pole holder.

8. The foldable device of claim 1, wherein said foldable device has an installation length selected for installation of said foldable device in a vehicle storage area.

9. A foldable device for transportation of sporting equipment comprising:
    a top rail generally in the configuration of an elongated rectangular prism and comprising a first top rail segment and a second top rail segment;
    a bottom rail opposing said top rail, said bottom rail generally in the configuration of an elongated rectangular prism and comprising a first bottom rail segment and a second bottom rail segment;
    a folding element extending between said top rail and said bottom rail, said folding element having a top end attached to said first top rail segment and said second top rail segment, and an opposing bottom end attached to said first bottom rail segment and said second bottom rail segment, such that said foldable device is foldable at said folding element;
    a first equipment mounting element attached to, and extending between, said top rail and said bottom rail;
    a first bracing element generally in the configuration of an elongated rectangular prism, said first bracing element attached to, and extending between, said top rail and said bottom rail and generally perpendicular to said top rail and said bottom rail and disposed adjacent to said first equipment mounting element, said first bracing element comprising a major plane, said first equipment mounting element comprising a major plane, and said first bracing element and said first equipment mounting elements disposed such that their respective major planes are generally perpendicular; and
    a second bracing element, said second bracing element attached to, and extending diagonally between, said first top rail segment and said first bottom rail segment.

10. The foldable device of claim 9, further comprising a second equipment mounting element attached to, and extending between, said top rail and said bottom rail.

11. The foldable device of claim 10, wherein said first equipment mounting element comprises a first fishing pole holder and said second equipment mounting element comprises a second fishing pole holder.

12. A foldable device for transportation of sporting equipment comprising:
    a top rail generally in the configuration of an elongated rectangular prism and comprising a first top rail segment and a second top rail segment;
    a bottom rail opposing said top rail, said bottom rail generally in the configuration of an elongated rectangular prism and comprising a first bottom rail segment and a second bottom rail segment;
    a folding element extending between said top rail and said bottom rail, said folding element having a top end attached to said first top rail segment and said second top rail segment, and an opposing bottom end attached to said first bottom rail segment and said second bottom rail segment, such that said foldable device is foldable at said folding element;
    a first equipment mounting element attached to, and extending between, said top rail and said bottom rail;

wherein said device is foldable to a folded configuration to cause a distal end of first top rail segment to abut a distal end of said second top rail segment, and to cause a distal end of first bottom rail segment to abut a distal end of said second bottom rail segment; and wherein a first attaching element is disposed on said first bottom rail segment, and a second attaching element is disposed on said second bottom rail segment element, and said first attaching element and said second attaching element attach to one another.

13. The foldable device of claim 12, wherein said first attaching element comprises a clasp and said second attaching element comprises a latch.

14. The foldable device of claim 12, wherein said first attaching element is disposed at said distal end of said first top rail segment, and said second attaching element is disposed at said distal end of said second top rail segment such that when said foldable device is in said folded configuration, said first attaching element is attachable to said second attaching element to lock said foldable device in said folded configuration.

15. The foldable device of claim 12, wherein said first attaching element is disposed at a proximal end of said first bottom rail segment, and said second attaching element is disposed at a proximal end of said second bottom rail segment such that when said foldable device is in an open configuration in which said first bottom rail segment and said second bottom rail segment are aligned to form a rectangular prism, said first attaching element is attachable to said second attaching element to lock said foldable device in said open configuration.

16. The foldable device of claim 12, further comprising a second equipment mounting element attached to, and extending between, said top rail and said bottom rail.

17. The foldable device of claim 16, wherein said first equipment mounting element comprises a first fishing pole holder and said second equipment mounting element comprises a second fishing pole holder.

18. A foldable device for transportation of sporting equipment comprising:
- a top rail generally in the configuration of an elongated rectangular prism and comprising a first top rail segment and a second top rail segment;
- a bottom rail opposing said top rail, said bottom rail generally in the configuration of an elongated rectangular prism and comprising a first bottom rail segment and a second bottom rail segment;
- a folding element extending between said top rail and said bottom rail, said folding element having a top end attached to said first top rail segment and said second top rail segment, and an opposing bottom end attached to said first bottom rail segment and said second bottom rail segment, such that said foldable device is foldable at said folding element;
- a first equipment mounting element attached to, and extending between, said top rail and said bottom rail;
- a plurality of adjusting elements, each of said plurality of adjusting elements comprising an adjustable, swivel-mounting leveling foot extending outwardly from opposing ends of said foldable device.

19. The foldable device of claim 18, further comprising a second equipment mounting element attached to, and extending between, said top rail and said bottom rail.

20. The foldable device of claim 19, wherein said first equipment mounting element comprises a first fishing pole holder and said second equipment mounting element comprises a second fishing pole holder.

* * * * *